United States Patent

Leonard

[15] 3,700,785
[45] Oct. 24, 1972

[54] MEANS FOR SIMPLIFIED REWRITING OF MUSIC

[72] Inventor: Verna M. Leonard, 6353 North Blackstone, Fresno, Calif. 93721

[22] Filed: July 2, 1971

[21] Appl. No.: 159,134

[52] U.S. Cl. ........................84/470, 84/483, 283/47
[51] Int. Cl. ..............................................G09b 15/00
[58] Field of Search........84/471, 477, 470, 483, 475, 84/472; 283/47

[56] References Cited

UNITED STATES PATENTS

| | | | |
|---|---|---|---|
| 1,393,710 | 10/1921 | Spencer | 283/47 |
| 1,099,372 | 6/1914 | Hughes | 84/471 |
| 1,526,547 | 2/1925 | Hughey | 84/471 |

*Primary Examiner*—Richard B. Wilkinson
*Assistant Examiner*—John F. Gonzales
*Attorney*—Knox & Knox

[57] ABSTRACT

The combination of a specially developed work sheet and sticker elements to guide original composition as well as rewriting of music in simplified form without resort to staff paper, a principal feature being means for simply and unmistakably indicating the raising or lowering in the pitch of the next succeeding note and/or chord, a relationship found by music instructors to be not immediately obvious to students, and the pattern of such succeeding relationships, necessary to achieve a desired feeling, mood, or impression in an original composition being found to be quickly and easily recognizable by even somewhat more advanced musicians when recorded according to the present invention. The work sheet carries a representation of a root tone and the notes of the corresponding scale and principal chords in an octave above and an octave below the same, marked writing areas with spaces therebetween, and pre-marked stickers are selectively adhered in the spaces so that the pitch relationships can be recognized at a glance.

2 Claims, 4 Drawing Figures

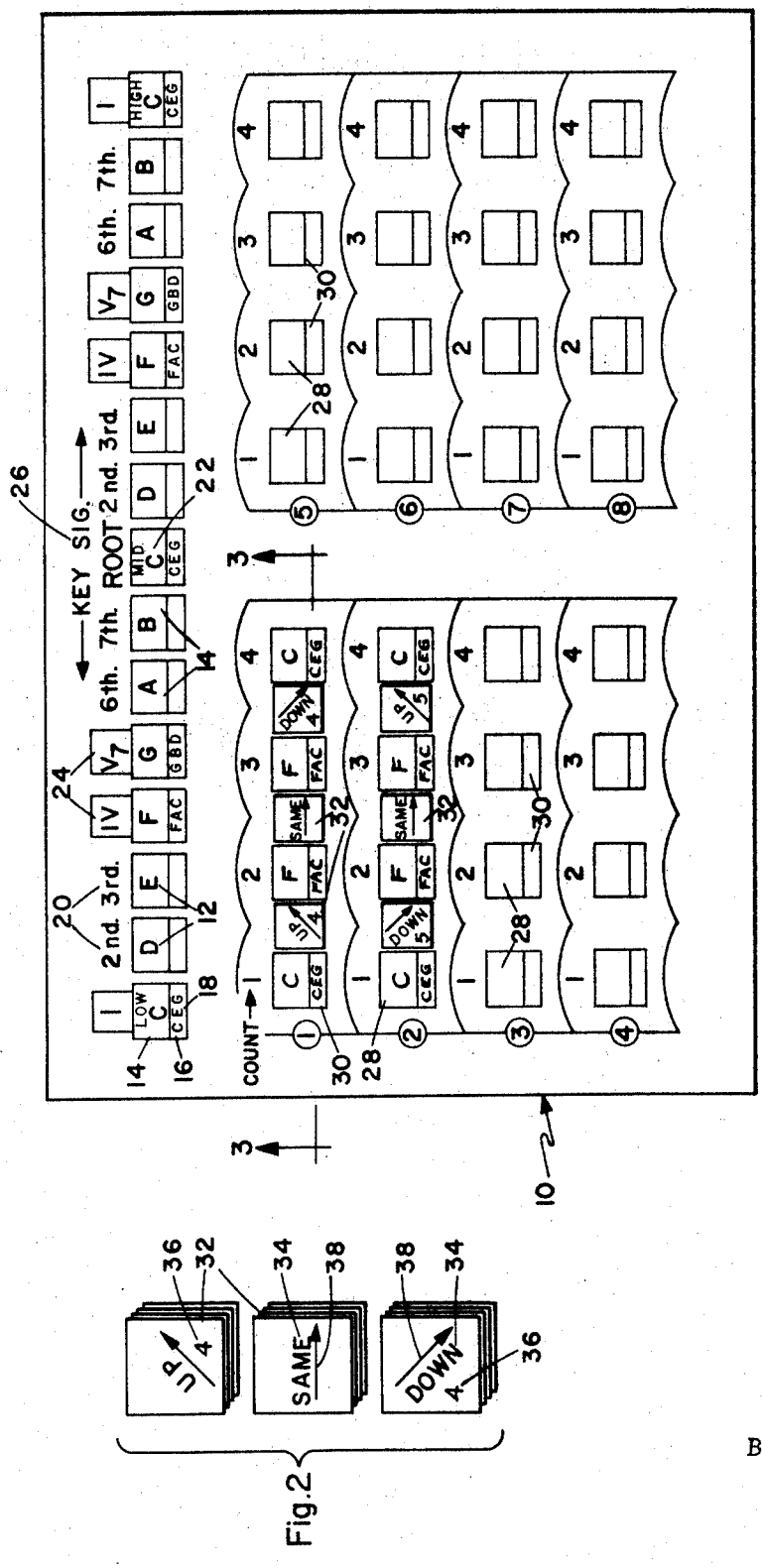
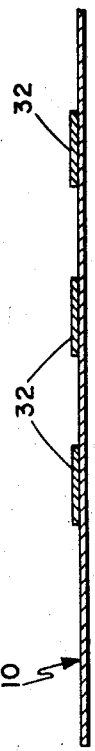
Fig. 1
Fig. 2
Fig. 3
Fig. 4
INVENTOR.
VERNA M. LEONARD
BY
Knox & Knox

MEANS FOR SIMPLIFIED REWRITING OF MUSIC

BACKGROUND OF THE INVENTION

The prior art contains numerous proposals for simplification of the means for recording music without initial dependence on staff notation, while work sheets and printed stickers per se are notoriously old. There is of course nothing novel in the representation of scale degrees in a single octave in relation to a root tone. The problem of the difficulty in visualizing melody, harmony and rythm in regular staff, notation music remains insurmountable to many people.

SUMMARY OF THE INVENTION

As hereinclaimed, this invention helps to overcome the difficulty mentioned immediately above by providing means to simplify the writing of a musical selection or at least a portion of the same. A worksheet carries a reference musical scale of two octaves with scale degrees and at least certain of the chords indicated along with the root tone as the first tone in the second octave. The worksheet also has spaced areas adjacent to the reference musical scale, and regularly spaced areas therebelow, preferably numbered so that the user may write in the names of the notes and chords. A plurality of pre-marked stickers are provided for selective placement on the spaces between the areas whereon the notes and chords are written by the user, these stickers indicating at a glance the general pitch relationship of the succeeding note and/or chord for faster and easier future reading of the completed worksheet.

BRIEF DESCRIPTION OF THE DRAWING

A preferred embodiment of the invention is represented in the accompanying drawing, in which:

FIG. 1 is a plan view of the worksheet partially filled in as in proposed use;

FIG. 2 is a group view of the worksheet stickers on an enlarged scale;

FIG. 3 is a cross-sectional fragmentary view of the worksheet, as taken on the line 3—3 in FIG. 1, and showing three of the stickers in place; and FIG. 4 is a view, similar to FIG. 3 and showing the spaced writing areas lined for writing in regular notation.

DETAILED DESCRIPTION OF THE PREFERRED EMBODIMENT

The worksheet, generally indicated by the numeral 10, is representative of a large number of such sheets proposed as best grouped in a folder or book form. Each worksheet has, preferably across the top thereof, an easily legible reference scale of two octaves with the letter names 12 of the notes in a series of boxes 14 and the lower parts 16 of these boxes carry indicia 18 showing a corresponding chord.

Above each box 14 there is indicia 20 denoting the scale degree relationship of the note with respect to the root tone or note 22 and certain ones 24 of said indicia 20 are in Roman numeral to indicate particular chords, particularly the root, fourth and fifth degree chords in both octaves. An indication of the key signature also appears as at 26.

It is important to point out, however, that the boxes 14 may be left blank for the user to fill in and this applies to the portion 16.

Beneath the boxes 14 there is provided novel interrupted musical notation means in the form of regularly spaced writing areas 28 arranged preferably in parrllel lines as shown in FIG. 1, each line being numbered according to the time count of the music concerned, as for example, 1-2-3 for waltz time or 1-2-3-4 when the music is to have four counts to the measure. Each writing area 28 has a portion 30 wherein the letters naming a chord can be written, and the writing areas are spaced apart a distance slightly greater than the width of the stickers 32.

The stickers 32 are pre-printed or otherwise provided with indicia to indicate the pitch change of the succeeding note and/or chord in the succeeding writing area 28, the indicia being "UP," "SAME" and "DOWN" preferably both as words 34, the number 36 of half tones or scale tones and corresponding arrows as at 38, and a large number of these stickers are provided since one sticker will be chosen for placement before each succeeding note and/or chord as they are written in by the user. The number of scale tones will be preferably the scale tone progression change rather than the simple spacing change. Otherwise stated, the number can be considered the scale degree destination rather than the number of interval steps.

If staff lines are preferred, the spaced writing areas are provided as indicated at 40, in lieu of the type shown at 28, and the user writes the notes in regular notation, still employing the stickers 32 between the short sections of staff lines constituting the writing areas 40.

It will now be evident how the present invention will enable the simplified writing of any portion of a musical selection and the coincident indication, observable at a glance, of the relationship, up, down or unchanged in pitch of each succeeding note or chord, the ready reference to the double octave representation in the boxes 14 making the writing and subsequent reading of the music easier and increasing confidence in the student since he knows at a glance whether the next note or chord is higher or lower on the key board or fingerboard.

I claim:

1. Means for guiding the writing and rewriting of music, comprising:
a worksheet having a plurality of regularly spaced writing surface areas demarked thereon in parallel lines and defining an interrupted musical notation means having the general characteristics of staff lines with a plurality of spaces in each line;
elements dimensioned for securement individually in said spaces between said spaced areas, each element indicating one of these directions, up, down, or same;
said instruction means, spaced areas and elements together being inplements for the discipline of writing or rewriting selected musical notation including notes and chords and indicating the relative pitch relationship of the same in each succeeding writing surface area.

2. Means for guiding the writing and rewriting of music according to claim 1 wherein said elements are dimensioned to fit into said spaces and are adhesively secured onto said work sheet.

* * * * *